United States Patent
O'Flynn et al.

(10) Patent No.: US 6,383,381 B1
(45) Date of Patent: May 7, 2002

(54) ELECTRIC WATER KETTLE AND FILTER

(75) Inventors: Brian J. O'Flynn, Richmond, VA (US); Michael Kin Chung Ho, Shau Kei Wan (HK)

(73) Assignee: Hamilton Beach/Procter-Silex, Inc., Glen Allen, VA (US)

( * ) Notice: Subject to any disclaimer, the term of this patent is extended or adjusted under 35 U.S.C. 154(b) by 0 days.

(21) Appl. No.: 09/421,679

(22) Filed: Oct. 20, 1999

Related U.S. Application Data

(60) Provisional application No. 60/117,303, filed on Jan. 26, 1999, and provisional application No. 60/105,205, filed on Oct. 22, 1998.

(51) Int. Cl.⁷ .......................... B01D 27/08; B01D 35/02
(52) U.S. Cl. .................. 210/232; 210/282; 210/467; 210/477; 210/482; 222/189.07
(58) Field of Search ................... 210/232, 238, 210/282, 466, 467, 473, 477, 481, 482, 484, 489; 222/189.06, 189.07, 189.08; 99/295, 323

(56) References Cited

U.S. PATENT DOCUMENTS

| | | | |
|---|---|---|---|
| 24,261 A | | 5/1859 | Fletcher |
| 62,002 A | | 2/1867 | Carmichel |
| 62,697 A | | 3/1867 | Simons |
| 652,413 A | * | 6/1900 | Wallingford et al. |
| 817,452 A | * | 4/1906 | Skinner |
| 866,545 A | * | 9/1907 | Whitman |
| 866,796 A | | 9/1907 | Martindale |
| 1,079,280 A | * | 11/1913 | Willard |
| 1,231,374 A | | 6/1917 | Jovanovitz et al. |
| 1,248,114 A | * | 11/1917 | Hershey |
| 1,314,829 A | * | 9/1919 | Parks |
| 1,357,744 A | * | 11/1920 | Taub |
| 2,183,773 A | | 12/1939 | Lehman |
| D285,160 S | | 8/1986 | Osit |
| 4,948,499 A | | 8/1990 | Peranio |
| 5,046,409 A | | 9/1991 | Henn |
| 5,672,274 A | * | 9/1997 | Wheeler et al. |

FOREIGN PATENT DOCUMENTS

| | | | |
|---|---|---|---|
| CA | 72871 | | 7/1993 |
| FR | 2711547 | * | 10/1993 |
| GB | 267330 | | 3/1927 |
| GB | 277841 | | 9/1927 |
| GB | 593962 | * | 10/1947 |
| GB | 2 251 547 A | | 7/1992 |
| GB | 2268680 | * | 1/1994 |
| GB | 2 261 362 B | | 6/1994 |
| GB | 2 274 791 A | | 8/1994 |
| GB | 2274792 | * | 8/1994 |
| GB | 2 280 596 A | | 2/1995 |
| GB | 2 284 563 B | | 10/1997 |
| WO | WO 89/00976 | | 2/1989 |

\* cited by examiner

Primary Examiner—David A. Simmons
Assistant Examiner—Fred Prince
(74) Attorney, Agent, or Firm—Roger S. Dybvig

(57) ABSTRACT

A water kettle and filter includes a receptacle having an interior for holding a quantity of liquid, the receptacle having a base and side walls, the side walls having a handle for enabling liquid to be poured out of the receptacle, a spout opposite the handle through which liquid can exit the receptacle, and a filter which comprises a filter plate and a water treatment cartridge mounted thereto. The filter plate is slidably mounted to the interior of the receptacle and the water treatment cartridge is slidably mounted and frictionally retained to the filter plate.

24 Claims, 7 Drawing Sheets

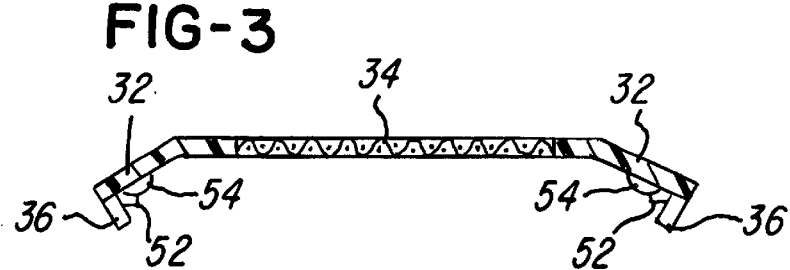
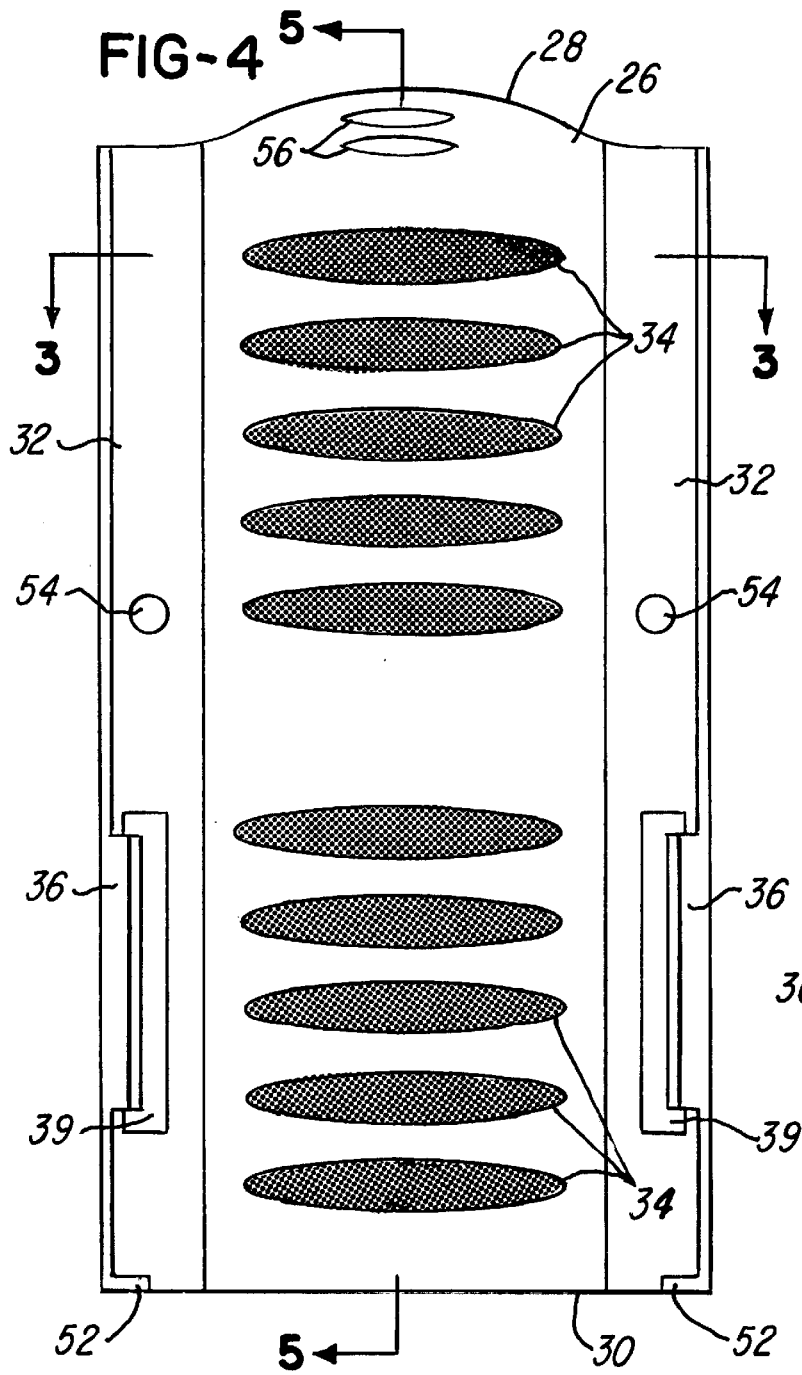
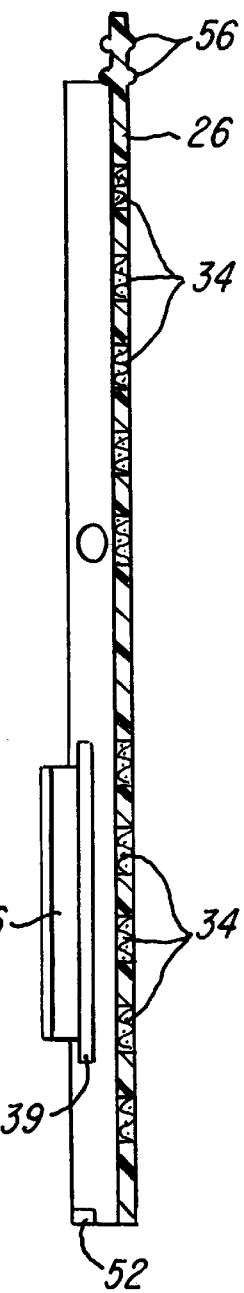

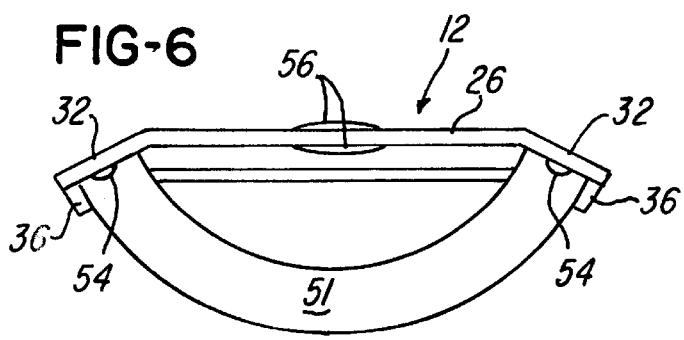
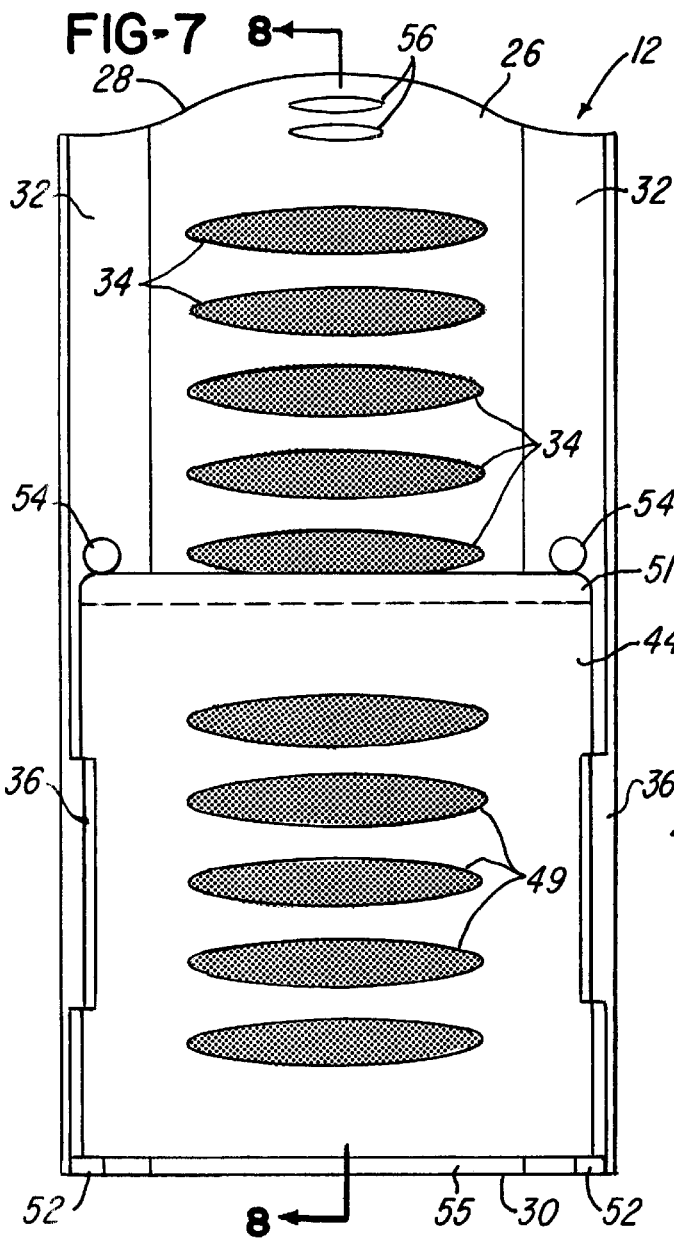
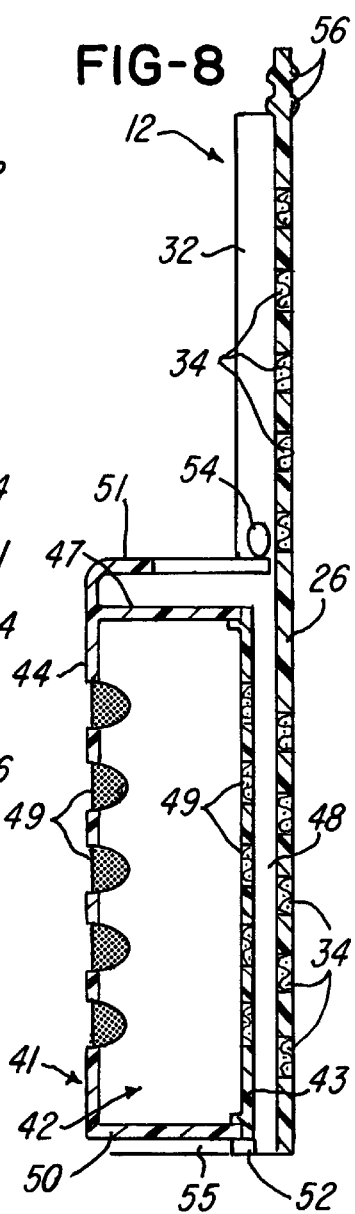

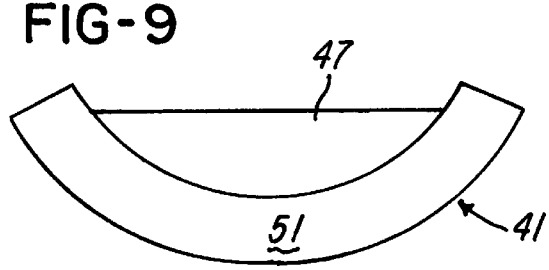
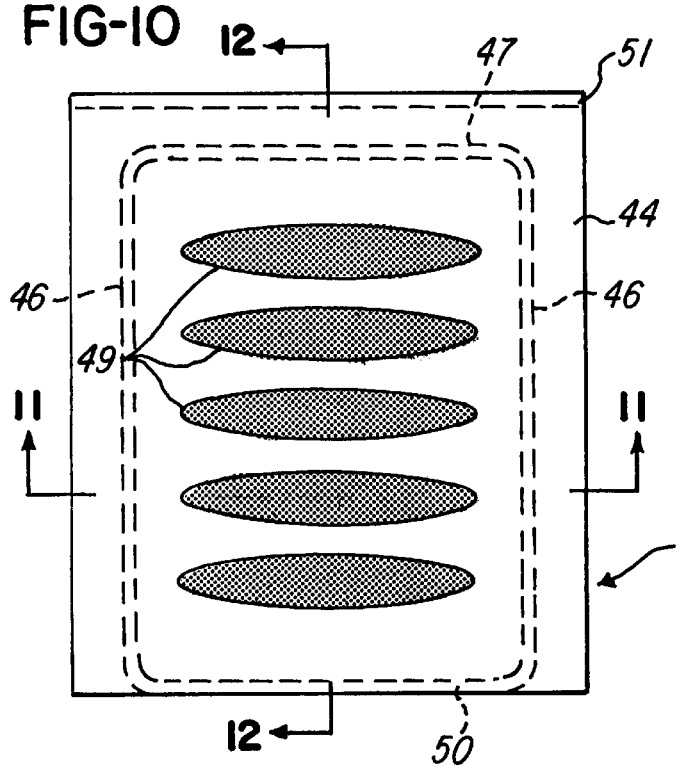
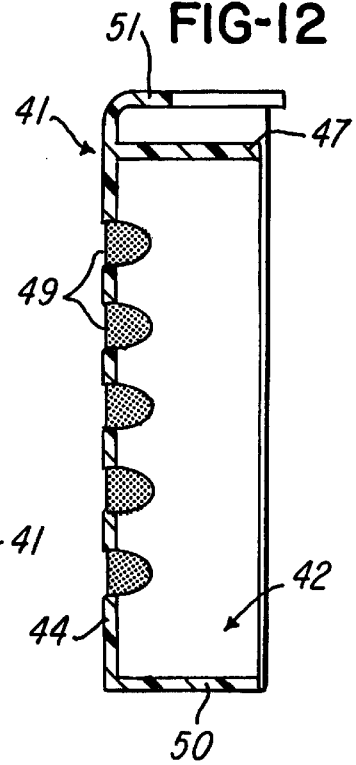
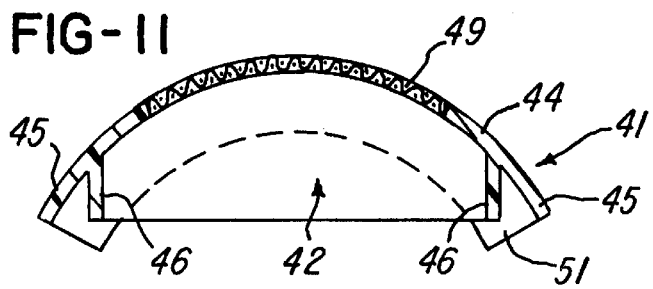

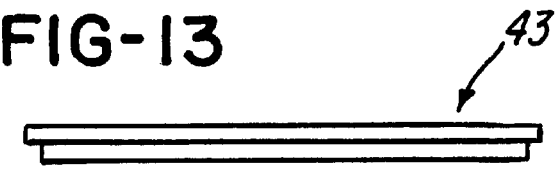
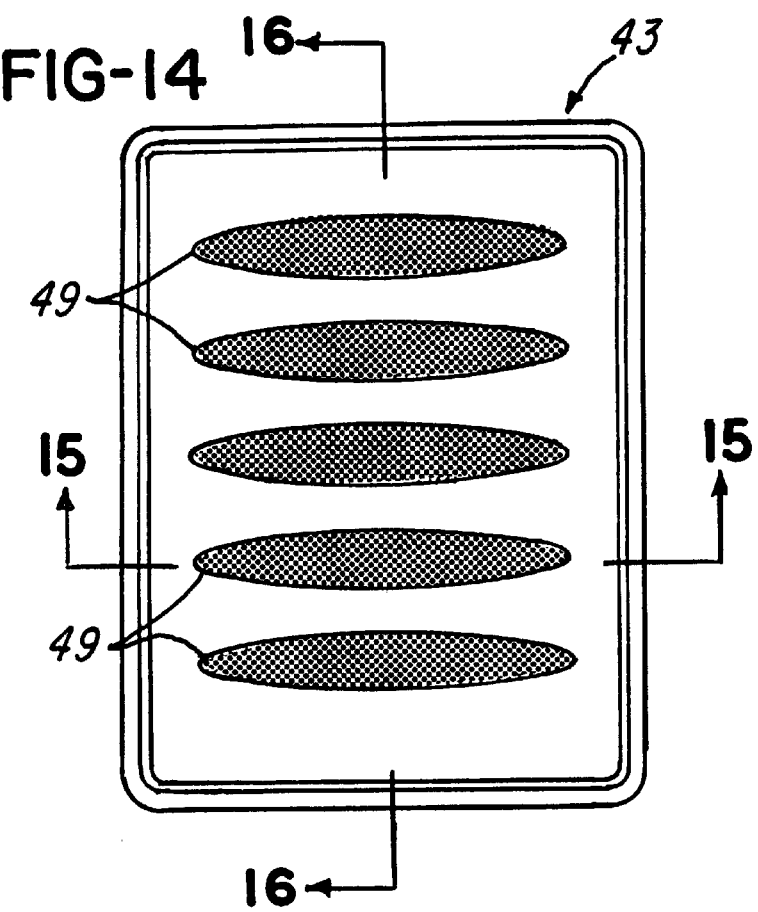
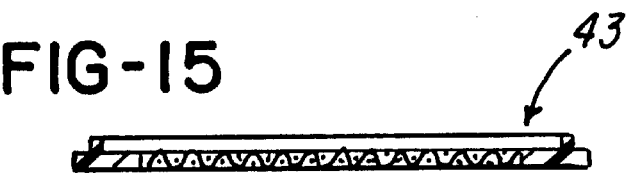

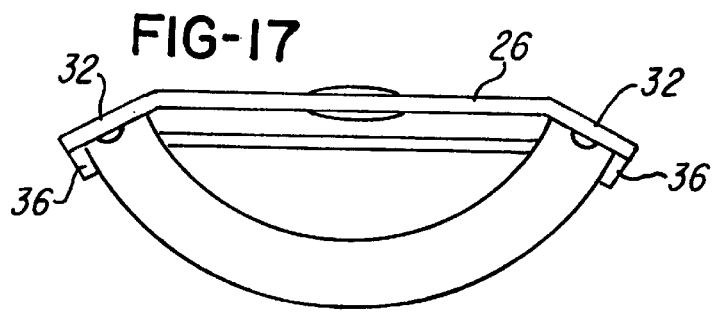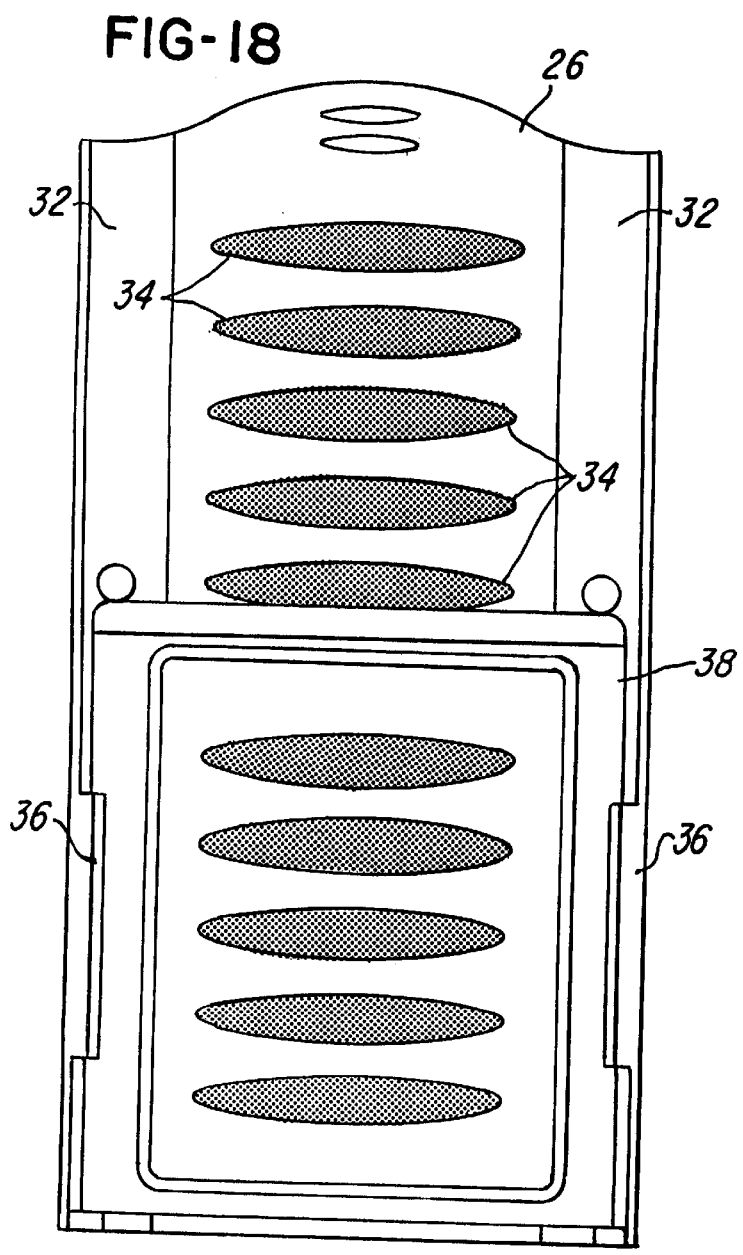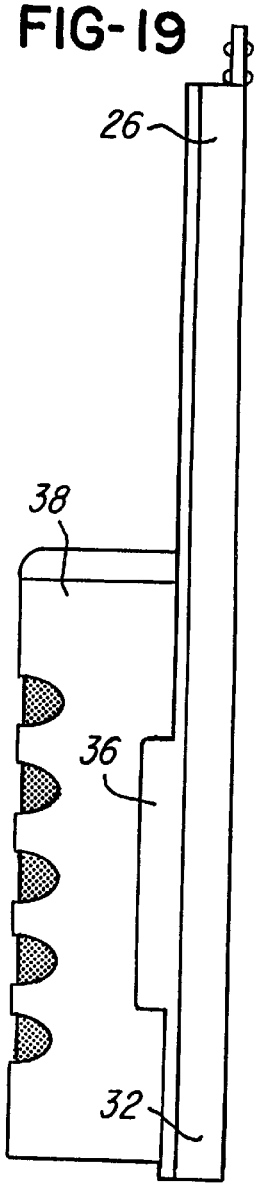

ELECTRIC WATER KETTLE AND FILTER

CROSS-REFERENCE TO RELATED APPLICATIONS

This is application claims the benefit of U.S. Provisional Application Ser. No. 60/105,205, filed Oct. 22, 1998 and U.S. Provisional Application Ser. No. 60/117,303, filed Jan. 26, 1999.

FIELD OF THE INVENTION

This invention relates to electric water kettles and filters therefore.

BACKGROUND OF THE INVENTION

It is well know that when water is heated, some impurities can precipitate within the water. Other scum or particulate matter may already be in the water along with a distasteful color, odor, or taste. There are many types of filters for electric water kettles that remove impurities and precipitates from the water or can remove objectionable color, odor, or bad taste from the water.

SUMMARY OF THE INVENTION

This invention performs both water purification processes by filtering the water for particulate matter and scum and also removing many distasteful properties associated with the water. Further, because a water treatment media, which is used to remove distasteful properties from the water, has only a limited useful life, the water treatment media can also be housed in a removable water treatment cartridge to be removed and replaced when the water treatment media no longer can perform its filtering function.

An object of this invention to provide a filter for an electric water kettle to remove particulate matter or scum from the water.

A further object of this invention to provide a filter for an electric water kettle to remove color, odor, and bad taste from the water.

Another object of this invention to provide a removable filter that has a water treatment cartridge which can be removed from the filter and replaced when the useful life of the water treatment media within the water treatment cartridge has expired.

Another object of this invention to provide a gap between the water treatment cartridge and the base of the receptacle to allow water in the base to freely pass under the water treatment cartridge to provide a better flow rate for the liquid and make pouring more consistent.

In accordance with this invention, the combination of a water kettle and filter comprises a receptacle having an interior for holding a quantity of liquid, the receptacle having a base and side walls, the side walls having a handle for enabling liquid to be poured out of the receptacle, a spout opposite the handle through which liquid can exit the receptacle, and a filter which comprises a filter plate and a water treatment cartridge mounted thereto, the filter plate being slidably mounted to the interior of the receptacle. The water treatment cartridge is slidably mounted and frictionally retained to the filter plate.

BRIEF DESCRIPTION OF THE DRAWINGS

FIG. 3 is a horizontal cross-sectional view of a filter plate forming part of the filter of FIG. 1 taken along lines 3—3 of FIG. 4.

FIG. 4 is a front elevational view of the filter plate.

FIG. 5 is a vertical cross-sectional view of the filter plate taken along lines 5—5 of FIG. 4.

FIG. 6 is a top plan view of the filter of FIG. 1, which includes the filter plate and a water treatment cartridge mounted to it.

FIG. 7 is a front elevational view of the filter.

FIG. 8 is a vertical cross-sectional view of the filter taken along lines 8—8 of FIG. 7.

FIG. 9 is a top plan view of the inner member.

FIG. 10 is a front elevational view of the inner member.

FIG. 11 is a cross-sectional view of the inner member taken along lines 11—11 of FIG. 10

FIG. 12 is a vertical cross-sectional view of the inner member taken along lines 12—12 of FIG. 10.

FIG. 13 is a top plan view of the outer wall.

FIG. 14 is a front elevational view of the outer wall.

FIG. 15 is cross-sectional view of the outer wall taken along lines 15—15 of FIG. 14.

FIG. 16 is a vertical cross-sectional view of the outer wall taken along lines 16—16 of FIG. 14.

FIGS. 17 through 19 are a top plan view of a second embodiment of the filter, a front elevational view of a second embodiment of the filter, and a right side elevational view of a second embodiment of the filter, the second embodiment differing from the first embodiment only in that the side margins of the filter plate in the second embodiment do not contain rectangular openings.

DESCRIPTION

Figure 1:
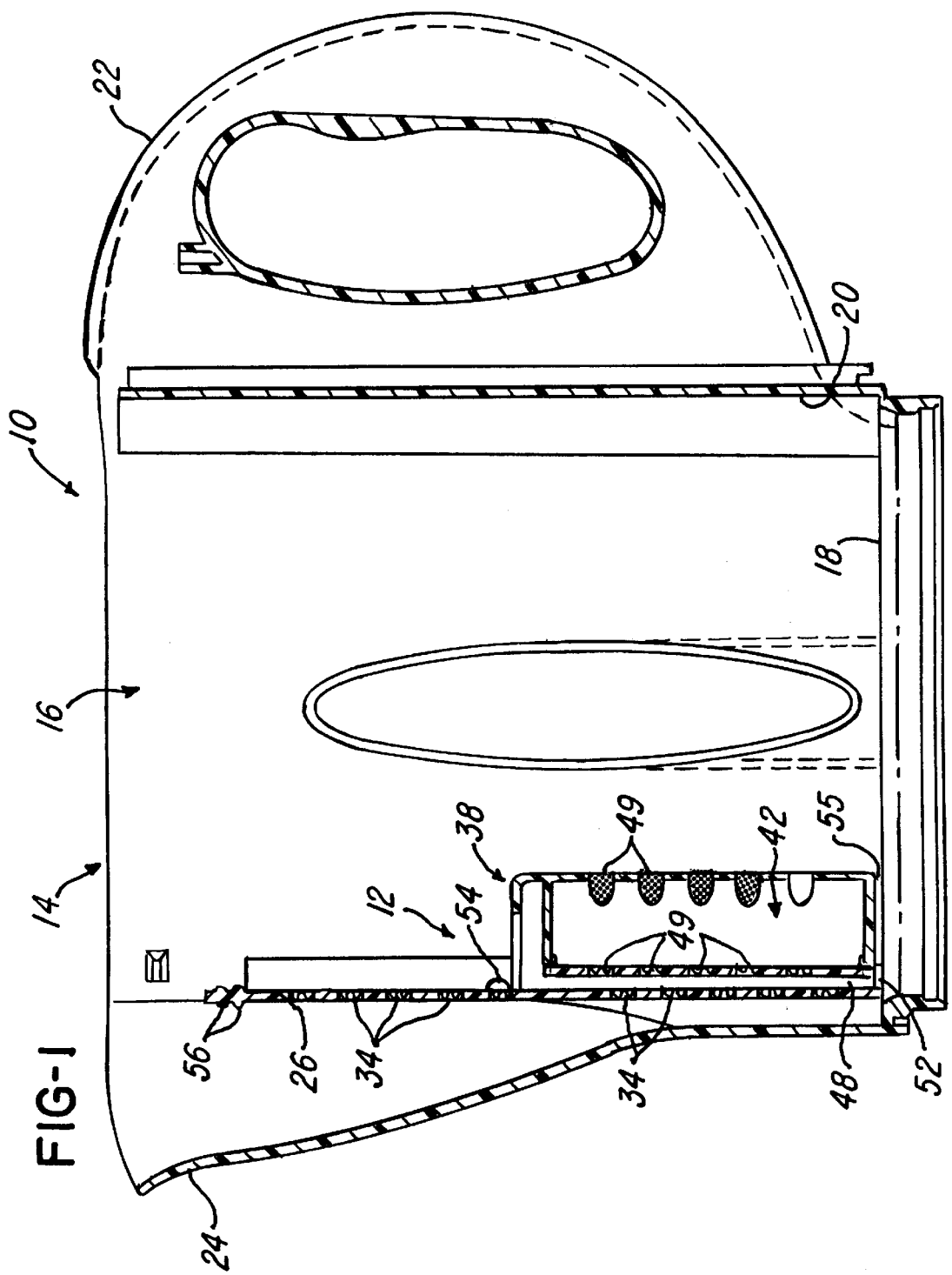
FIG. 1 is a vertical cross-sectional view of an electric water kettle and filter in accordance with this invention.
Figure 2:
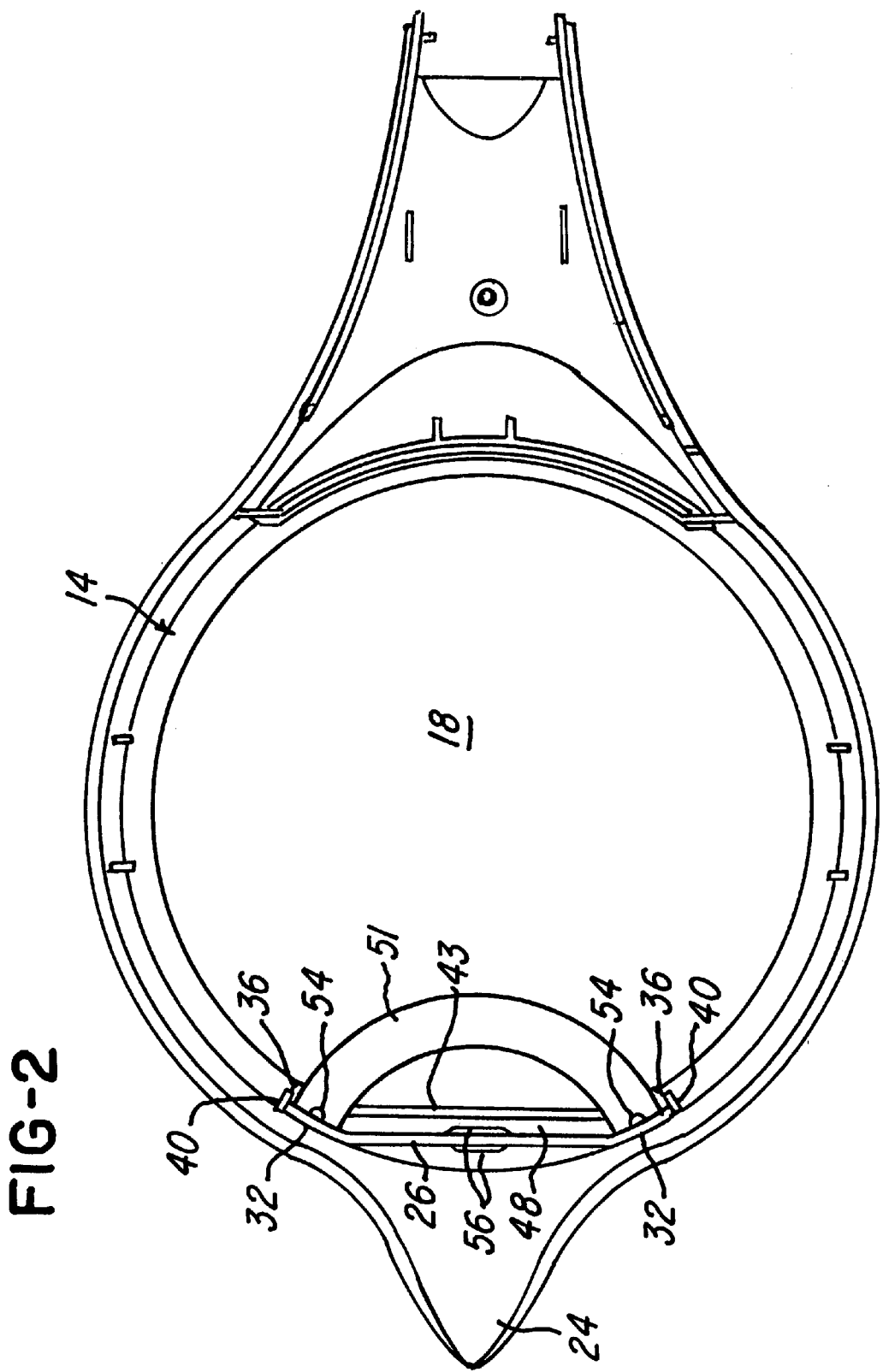
FIG. 2 is a top plan view of the water kettle and filter of FIG. 1.

As shown in FIGS. 1 and 2, an electric water kettle and a filter, generally designated 10 and 12 respectively, in accordance with this invention, comprise a receptacle 14 having an interior 16 defined by a base 18 and a side wall 20 for holding a quantity of liquid, a handle 22 mounted on the outside of the side wall 20, a spout 24 formed by the side wall 20, opposite the handle 22, through which liquid can be poured from the receptacle 14, and a filter 12 comprising a filter plate 26 having a water treatment cartridge 38 mounted thereto, the filter plate 26 being slidably mounted to the interior 16 of the receptacle 14. The base 18 houses the device for heating the water (not shown). It should be understood that this invention can also be used with water kettles that are not electric and that do not heat water.

The filter plate 26, preferably made of polypropylene, slidably mounts within the interior 16 of the receptacle 14 in front of the spout 24. As best shown in FIGS. 4 and 5, the plate 26 has a top margin 28, bottom margin 30, and two inwardly angled side margins 32. The plate 26 also has several mesh-covered apertures 34. When liquid is poured from the spout 24, the mesh-covered apertures 34 filter out particulate matter or scum present within the water or particulate matter formed when heating the water. Currently, a polyester mesh filter material having a mesh count of 120 openings per inch is the preferred mesh material. The filter plate 26 also has ribs 36 mounted perpendicularly to the inwardly angled side margins 32, best shown in FIGS. 1 and 3. FIGS. 4 and 5 also show rectangular openings 39 formed in the side margins 32. The rectangular openings 39 are used during manufacturing to mount the ribs 36 on the side margins 32 of the plate 26 and have no other useful function.

The ribs 36 are mounted on the inwardly angled side margins 32 intermediate the openings 39 and the ends of the side margins 32. The interior surface of each inwardly angled side margin 32 and its corresponding rib 36 cooperate to receive and hold a water treatment cartridge 38 which is slidably mounted and frictionally retained to the plate 26, as further discussed below.

In an alternative embodiment, shown in FIGS. 17, 18, and 19, the rectangular openings 39 in the side margins 32, best shown in FIGS. 4 and 5, have been removed. The rectangular openings 39 are formed in the side margins 32 to simplify the tooling used to form the ribs 36 on the side margins 32 of the plate 26. However, if the plate 26 were to be used without a water treatment cartridge 38, such as when a replacement cartridge 38 is unavailable or unwanted, unfiltered water could pass through the rectangular openings 39 and exit the spout 24 without passing through the mesh-covered apertures 34 of the plate 26. Therefore, the alternative embodiment shown in FIGS. 17 through 19 comprises a plate 26 having no apertures or openings formed in the side margins 32. This alternative embodiment is identical to the first embodiment except for the removal of the rectangular openings 39 from the side margins 32.

To hold the plate 26 in front of the spout 24, vertical ribs 40, shown in FIG. 2, are formed on the inside surface of the side wall 20. The vertical ribs 40 slidably receive the inwardly angled side margins 32 of the plate 26. The vertical ribs 40 are located on both sides of the spout 24 to hold the plate 26 in front the spout 24. British Patent Application No. GB 2,268,680 A, a copy of which is enclosed, shows vertical ribs mounted to the inside of a receptacle for slidably engaging the outside margins of a filter, similar to what is disclosed herein, and its entire disclosure is hereby incorporated by reference herein. The vertical ribs 40, in accordance to this invention, extend substantially to the base 18 of the receptacle 14. Therefore, the plate 26 can extend to the base 18 of the receptacle 14 thereby not allowing liquid to exit the spout 24 without passing through the mesh-covered apertures 34 of the plate 26.

The water treatment cartridge 38, best shown assembled in FIG. 8 and disassembled in FIGS. 9 through 16, comprises an inner member 41 and an outer wall member 43. The inner member 41 comprises and arcuate inner wall 44 with mounting margins 45, a top wall 47, a bottom wall 50, two side walls 46, and an arcuate engagement surface 51. The top wall 47, bottom wall 50, and two side walls 46 extend outwardly from a portion of the arcuate inner wall 44, with the side walls 46 located inwardly of the mounting margins 45. A compartment 42, for holding a quantity of water treatment media, is defined by a portion of the arcuate inner wall 44, the outwardly extending top wall 47, bottom wall 50, and side walls 46, and an outer wall member 43 which is mounted to the outwardly extending walls 47,50,46 to enclose the compartment 42. Both the portion of the arcuate inner wall 44 defining the compartment 42 and the outer wall member 43 closing the compartment 42 have a plurality of mesh-covered apertures 49. These mesh-covered apertures 49 operate to hold the water treatment media within the compartment 42 while at the same time allowing water to flow through the compartment 42.

A water treatment media such as an activated carbon or an ion exchange resin, or both, which helps remove color, odor, and bad taste from the water, can be housed within the compartment 42. As is well known in the art, water within the kettle 10 does not need to pass directly through the water treatment media to be treated. Water throughout the receptacle 14 can be treated by submerging or partially submerging the water treatment media in contact with some of the water within the receptacle 14.

Preferably the water treatment cartridge 38 is removable from the plate 26 so that when the useful life of the water treatment media expires, the water treatment cartridge 38 can be removed from the plate 26 and replaced with a new water treatment cartridge 38. The useful life of the water treatment media can be measured using one of two methods. First, it can be assumed that a water treatment media has a useful life relative to the number of gallons of water it has treated. Therefore, the water treatment cartridge 38, after a certain number of full capacity uses in the kettle 10, can be discarded and replaced with a new water treatment cartridge 38. Also, one could measure a water treatment media's useful life by the average number of days the water treatment cartridge 38 is used.

Optionally, instead of being removable, the water treatment cartridge 38 could be permanently mounted to the plate 26 so that when the useful life of the water treatment media expires, the entire filter 12 can be discarded and replaced by a new filter 12. However, the presently preferred embodiment is for the water treatment cartridge 38 to be removable from the plate 26 as described in greater detail below.

In use, the water treatment cartridge 38 slidably mounts on the plate 26, shown in FIGS. 7 and 8. The plate 26 then slidably mounts within the receptacle 14, as disclosed above. The mounting margins 45 of the arcuate inner wall 44 of the water treatment cartridge 38 slidably engage the ribs 36 extending from the inwardly angled side margins 32 of the plate 26. Obviously, other shapes and configurations for the water treatment cartridge 38 could be utilized and slidably mounted to the plate 26 in a manner described herein. With reference to FIGS. 2 and 6 through 8, to slidably engage the water treatment cartridge 38, one positions the water treatment cartridge 38 above the ribs 36 with the mounting margins 45 of the arcuate inner wall 44 between the ribs 36. The water treatment cartridge 38 then can slide downwardly relative to the plate 26 so that the mounting margins 45, best shown in FIG. 6, are engaged between the ribs 36. To complete the mounting process, the ends of the arcuate engagement surface 51 of the inner member 41 slide over the protrusions 54 mounted to the inwardly angled side walls 32 of the plate 26. As shown in FIGS. 1, 2, 6, and 8, the mounting arrangement of the water treatment cartridge described herein provides for a channel 48 between the outer wall member 43 and the plate 26. This channel 48 allows water passing through the water treatment cartridge 38 and more importantly allows water from below the water treatment cartridge 38, as discussed in detail below, to pass through the plate 26.

One or more stops or feet 52, two being shown in the drawings, are located at the bottom margin 30 of the inwardly angled side margins 32, as best shown in FIGS. 1, 3, 4, 5, 7, and 8. When the water treatment cartridge 38 slidably engages the plate 26, the feet 52 stop the water treatment cartridge 38 from sliding downwardly too far and thus out of engagement with the plate 26. Also, the feet 52 are located high enough on the bottom margin 30 of the inwardly angled side margins 32 that the water treatment cartridge 38 does not slide completely to the bottom margin 30 of the plate 26, while the bottom margin 30 of the plate 26 can slide to the base 18 of the receptacle 14 due to the vertically extending ribs 40 as discussed above. Accordingly, a gap 55 is created, shown in FIGS. 1, 7, and 8, between the bottom of the water treatment cartridge 38 and the base 18 of the receptacle 14 whereby water can flow beneath the water treatment cartridge 38 and into the channel 48 and through the mesh-covered apertures 34 of the plate 26 to exit the spout 24. This is because the water treatment media located within the compartment 42 slows down water passing through the cartridge 38 and thus passing through the plate 26. This water slow down can inhibit the liquid flow rate and can cause inconsistent pouring. Thus, by allowing water to bypass the water treatment cartridge 38 rather than going directly through it to exit the plate 26, pouring will be more consistent.

As mentioned above, the water treatment cartridge 38 is also frictionally held in vertical position with regard to the plate 26 by two protrusions 54. The protrusions 54, best seen in FIGS. 1 through 4, and 6 through 8, are located on both inwardly angled, side margins 32 of the plate 26. These protrusions 54, which engage the arcuate engagement surface 51 of the inner member 41, keep the water treatment cartridge 38 from sliding vertically upward and out of engagement with the plate 26 during use. Though large enough to keep the water treatment cartridge 38 in a fixed vertical position during use, the protrusions 54 are small enough to enable one to slide the water treatment cartridge 38 upwardly with respect to the plate 26 for removal and replacement.

In removing the plate 26, either alone or with the water treatment cartridge 38 attached, both the front and back sides of the plate 26 are provided with a plurality of thumb grooves 56, as seen in FIGS. 1, 2, and 4 through 8. The thumb grooves 56 consist essentially of raised grooves or ridges located at the upper margin 28 of the plate 26. The thumb grooves help one grasp the plate 26 and pull it upwardly out of the water kettle 10 and out of engagement with the vertical ribs 40.

Although the presently preferred embodiment of this invention have been described, it will be understood that within the purview of the invention various changes may be made within the scope of the following claims.

Having thus described our invention, we claim:

1. A water kettle and filter comprising:
   a receptacle having an interior for holding a quantity of liquid comprising a base and side walls, said side walls having a handle for enabling liquid to be poured out of the receptacle and a spout opposite said handle through which liquid can exit said receptacle;
   ribs mounted to said interior of said receptacle;
   a plate having a top, bottom, and two side margins, said side margins slidably engaging said ribs so that said plate may be mounted within said interior and slidably removed from said interior; and
   a water treatment cartridge slidably mounted and frictionally retained to said plate.

2. A water kettle and filter of claim 1 wherein said ribs are vertically mounted within said interior of the receptacle and extend substantially to the base on either side of said spout so that when said plate is slidably mounted within the interior of the receptacle, the plate extends to the base of the receptacle.

3. A water kettle and filter comprising:
   a receptacle having an interior for holding a quantity of liquid comprising a base and side walls, said side walls having a handle for enabling liquid to be poured out of the receptacle and a spout opposite said handle through which liquid can exit said receptacle;
   ribs mounted to said interior of said receptacle;
   a plate having a top, bottom, and two side margins, said side margins slidably engaging said ribs so that said plate may be mounted within said interior and slidably removed from said interior; and a water treatment cartridge slidably mounted and frictionally retained to said plate, said plate further comprising a rib located on each said side margin for slidably mounting said water treatment cartridge to said plate.

4. A water kettle and filter of claim 3 wherein said plate further comprises a plurality of mesh-covered apertures.

5. A water kettle and filter of claim 4 wherein said water treatment cartridge comprises a compartment defined by an inner wall, side walls extending forwardly from said inner wall, and an outer wall member mounted to said forwardly extending side walls.

6. A water kettle and filter of claim 5 wherein said compartment contains an activated carbon.

7. A water kettle and filter of claim 5 wherein said compartment contains an ion exchange resin.

8. The water kettle and filter of claim 6 wherein a portion of said inner wall and said outer wall member further comprise a plurality of mesh-covered apertures.

9. A water kettle and filter comprising:
   a receptacle having an interior for holding a quantity of liquid comprising a base and side walls, said side walls having a handle for enabling liquid to be poured out of the receptacle and a spout opposite said handle through which liquid can exit said receptacle;
   ribs mounted to said interior of said receptacle;
   a plate having a top, bottom, and two side margins, said side margins slidably engaging said ribs so that said plate may be mounted within said interior and slidably removed from said interior; and a water treatment cartridge slidably mounted and frictionally retained to said plate, said plate having an inside surface, said inside surface having a protrusion located on both said side margins to secure said water treatment cartridge vertically relative to said plate and prevent the accidental upward slidable movement of the water treatment cartridge after engagement.

10. The water kettle and filter of claim 9 wherein said plate further comprises at least one foot stop mounted to said inside surface of said plate below said protrusions to hold said water treatment cartridge in a fixed vertical position and to prevent further downward movement of said water treatment cartridge relative to said plate after slidable engagement.

11. The water kettle and filter of claim 10 wherein said plate comprises mesh-covered apertures and wherein said plate extends to the base of said receptacle and said at least one foot stop is positioned so that said water treatment cartridge cannot extend to the base, thereby allowing some of the water within said water kettle to bypass the water treatment cartridge and flow below the water treatment cartridge and through the mesh-covered apertures to exit the receptacle.

12. The water kettle of claim 1 wherein said plate further comprises a plurality of thumb-engageable surfaces located at the upper margin for grasping said plate during removal.

13. A water kettle and filter comprising:
   a receptacle having an interior for holding a quantity of liquid comprising a base and side walls, said side walls having a handle for enabling liquid to be poured out of the receptacle and a spout opposite said handle through which liquid can exit said receptacle;
   ribs mounted to said interior of said receptacle;
   a water filter comprising a plate having a top, bottom, two side margins and an inside surface, said plate having a protrusion located on both side margins; and a water treatment cartridge slidably mounted vertical relative to said plate and frictionally retained thereto through slidable engagement between said ribs and said side margins.

14. The water kettle and filter of claim 13 wherein said ribs are vertically mounted within said interior of the receptacle and extend substantially to said base on either side of said spout so that when said plate is slidably mounted within the interior of the receptacle, the plate extends to the base of the receptacle.

15. The water kettle and filter of claim 13 wherein said plate further comprises a rib located on each said side margin for slidably mounting said water treatment cartridge to said plate.

16. The water kettle and filter of claim 13 wherein said water treatment cartridge comprises a compartment defined by an inner wall, side walls extending forwardly from said inner wall, and an outer wall member mounted to said forwardly extending side walls.

17. The water kettle and filter of claim 13 wherein said water filter further comprises a plurality of mesh-covered apertures in said plate.

18. The water kettle and filter of claim 17 wherein said compartment contains an activated carbon.

19. The water kettle and filter of claim 17 wherein said compartment contains an ion exchange resin.

20. The water kettle and filter of claim 17 wherein a portion of both of said inner wall and said outer wall member further comprise a plurality of mesh-covered apertures.

21. The water kettle and filter of claim 20 wherein said plate has an inside surface, said inside surface having a protrusion located on both said side margins to secure said water treatment cartridge in a fixed vertical position and prevent the accidental upward slidable movement of the water treatment cartridge after engagement.

22. The water kettle and filter of claim 21 wherein said plate further comprises at least one foot stop mounted to said inside surface of said plate below said protrusions to hold said water treatment cartridge in a fixed vertical position and to prevent further downward movement of said water treatment cartridge relative to said plate after slidable engagement.

23. The water kettle and filter of claim 22 wherein said plate extends to the base of said receptacle and said at least one foot stop is positioned so that said water treatment cartridge cannot extend to the base, thereby allowing some of the water within said water kettle to bypass the water treatment cartridge and flow below the water treatment cartridge and through a channel formed between said outer wall member and said plate and through the mesh-covered screens to exit the receptacle.

24. The water kettle of claim 13 wherein said plate further comprises a plurality of thumb-engageable surface portions located at the upper margin for grasping said plate during removal.

* * * * *